Oct. 7, 1952  V. M. IPSEN  2,612,862
CHICKEN COOP

Filed Jan. 17, 1950  3 Sheets-Sheet 1

INVENTOR.
Victor M. Ipsen
BY
Wilfred E. Lawson
ATTORNEY

Oct. 7, 1952　　　V. M. IPSEN　　　2,612,862
CHICKEN COOP

Filed Jan. 17, 1950　　　3 Sheets-Sheet 3

INVENTOR.
Victor M. Ipsen
BY
Wilfred E. Lawson
ATTORNEY

Patented Oct. 7, 1952

2,612,862

UNITED STATES PATENT OFFICE 2,612,862

CHICKEN COOP

Victor M. Ipsen, Temple City, Calif.

Application January 17, 1950, Serial No. 138,980

3 Claims. (Cl. 119—18)

This invention relates to chicken coops and more particularly to individual cages for chickens.

The object of the invention is to provide individual wire cages for chickens or the like adapted to be hung in chicken houses for the purpose of culling chickens as soon as they drop in egg production, of controlling diseases, saving on time and labor and so forth.

Another object of the invention is to provide individual wire cages comprising partitions, bottoms, backs and fronts adapted to be shipped and stored in disassembled condition and adapted to be assembled easily and quickly.

A further object of the invention is to provide individual wire cages of the character indicated above each part of which is designed for a special purpose.

An additional object of the invention is to provide individual wire cages of the character indicated above the partitions of which are equipped with all the hooks necessary for assembling the cage, so that the troublesome work of bending wires, clipping on rings and the like is eliminated and the use of tools is limited to the use of a pair of pliers for closing the loops.

Another object of the invention is to provide individual wire cages of the character indicated above having easily operated doors, which will stay securely in open or closed position and which allow the hen better access to the feeder without bruising her breast.

A still further object of the invention is to provide a wire cage of the character indicated above which is equipped with feeders giving protection to the egg baskets preventing feed and hen slobber from coming into contact with the eggs.

Another object of the invention is to provide wire cages, the floor of which gives the eggs an opportunity to dry before rolling out onto the dusty wires of the egg basket.

The invention consists in the details of construction and in the combination and arrangement of the several parts of my improved chicken coops whereby certain advantages are attained, as will be hereinafter more fully set forth.

In order that my invention may be better understood, I will now proceed to describe the same with reference to the accompanying drawings, wherein:

In the drawings:

Figure 2 is a side view in elevation of a side wall or partition.

Figure 3 is a view in perspective of the bottom of the cage, the forward end portion of the bottom forming an egg basket.

Figure 1:
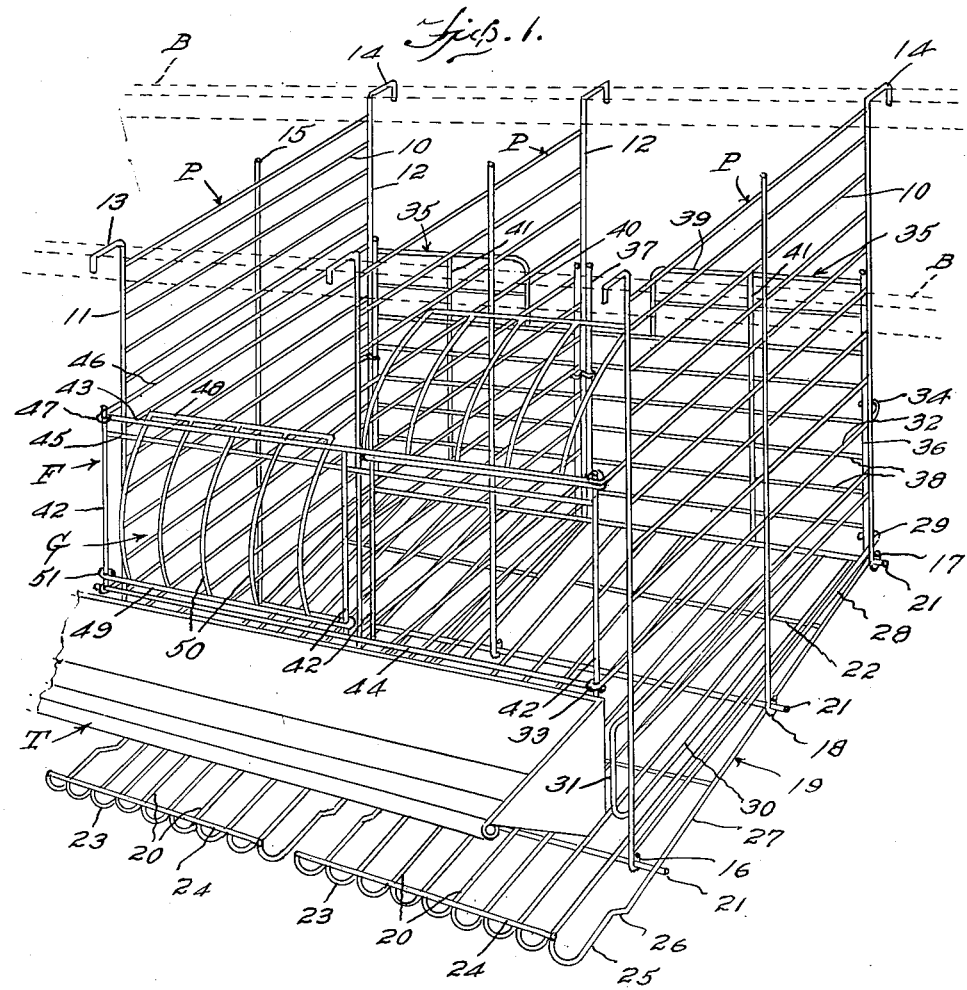
Figure 1 is a view in perspective of a pair of adjoining individual wire cages constructed in accordance with the invention, equipped with a feeder.
Figure 4:
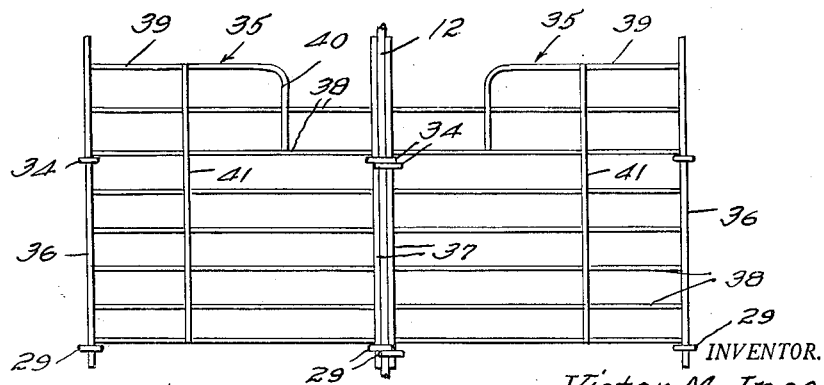
Figure 4 is a view in elevation of the back of the cage.
Figure 5:
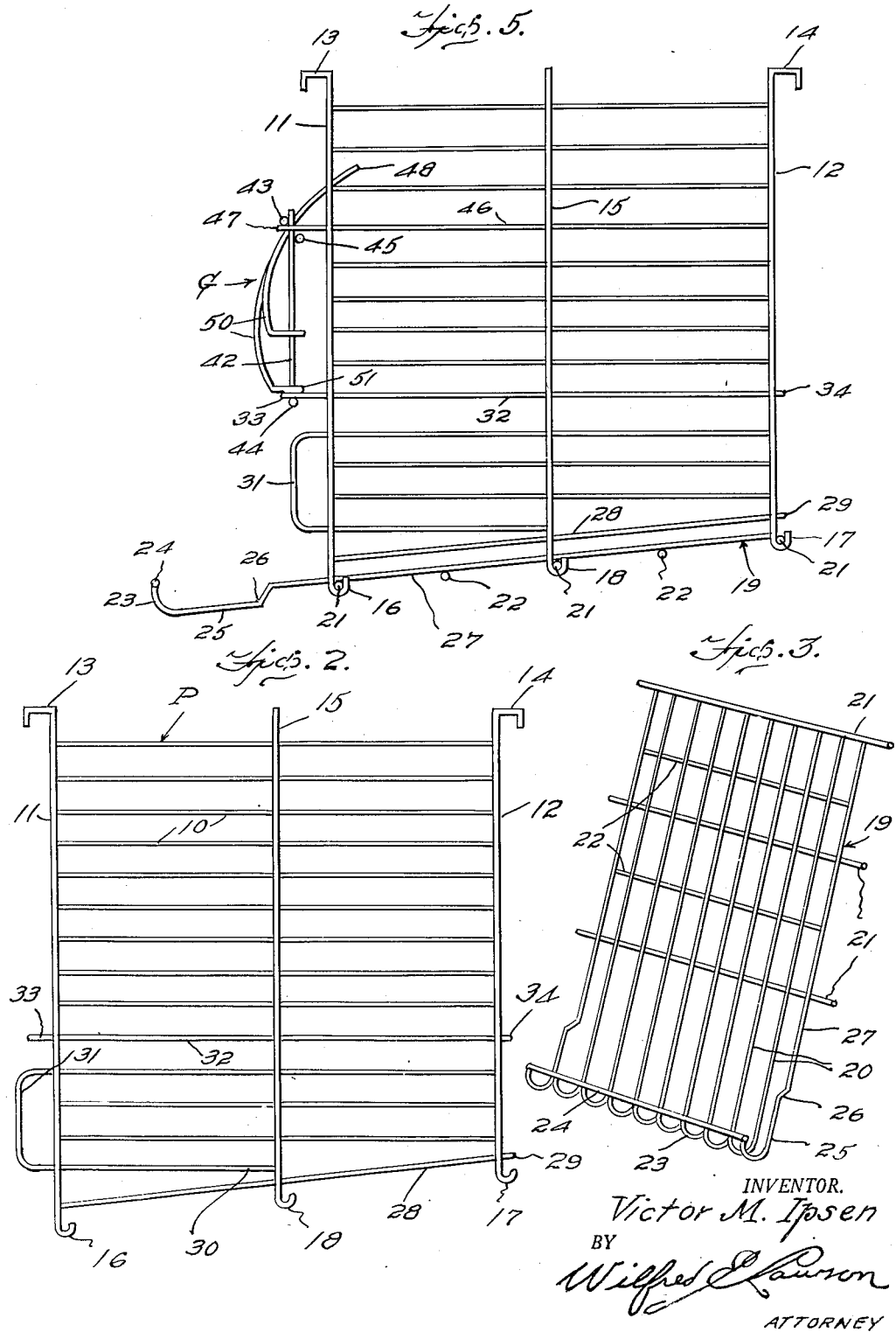
Figure 5 is a side view in elevation of a cage.

The individual wire cage as embodied herein comprises a pair of side walls or partitions P, each of which has a plurality of horizontal wires 10 secured in any suitable manner such as welding, soldering or the like to a vertically extending front corner wire 11 and a vertical rear corner wire 12. The upper end portion of the front corner wire 11 extends beyond the uppermost horizontal wire 10 and is bent to form a rectangular hook 13 extending forwardly and adapted to engage a beam or the like provided in the chicken coop to support the individual cages. The rear corner wire 12 extends also beyond the uppermost horizontal wire 10 and has a rearwardly extending rectangular hook 14 at its top end adapted to engage a second beam arranged in the chicken coop.

Centrally between the front and rear corner wires 11 and 12 respectively a vertical stiffening wire 15 is secured to the horizontal wires 10 and this wire 15 and the two corner wires 11 and 12 extend downwardly beyond the lowermost horizontal wire 10 and the lower end portions of the vertical wires are bent upwardly to form open hooks 16, 17 and 18 respectively. The front corner wire 11 extends farther down than the stiffening wire 15 and the latter extends farther down than the rear corner wire 12.

The bottom 19 of the cage comprises a plurality of longitudinal wires 20 secured in any suitable way such as welding, soldering or the like on top of three transverse bottom wires 21 which are spaced from each other at distances equal to the distances between the centers of the open hooks 16, 17 and 18. The longitudinal wires 20 are disposed equidistantly from each other. Intermediate the transverse bottom wires 21 transverse stiffening wires 22 are secured in any suitable manner underneath the longitudinal bottom wires 20. The wires 20 extend forwardly beyond the front transverse bottom wire 21 and the foremost end portion of each longitudinal bottom wire 20 is curved upwardly as at 23.

A transverse guard wire 24 is secured by soldering or the like to the upwardly pointing tip ends of the end portions 23 of the longitudinal bottom wires 20 and extends beyond both outside longitudinal bottom wires 20. The wire forming the guard 24 is then curved at both ends downwardly and rearwardly as at 25 so that it extends horizontally rearward at a slightly higher level than the longitudinal bottom wires 20 as at 26. The guard wire is then bent to extend rearwardly at the same level as the longitudinal bottom wires 20 as at 27 and the rearwardly extending portions 27 of the guard wire are secured on the transverse bottom wires 21 which extend beyond the wire portions 27.

When a pair of side walls or partitions P are hung with their rectangular hooks 14 on the two beams they are disposed at such distance from each other that the bottom 19 fits between the partitions the transverse bottom wires 21 resting in the hooks 16, 17 and 18 and the front end portions of the bottom wires 20 extending forwardly beyond the front corner wires 11 of the partitions P. Since the hooks 16, 17 and 18 are arranged at different levels as described above the bottom 19 inclines forwardly when mounted between the partitions P.

A lateral guard wire 28 is secured to the two corner wires 11 and 12 and to the stiffening wire 16 equidistantly above the hooks 16, 17 and 18 formed on said wires. The lateral guard wire 28 extends rearwardly beyond the corner wire 12 and is curved to form an open hook 29 on its rearmost end portion.

A wire 30 is secured with its rearmost end portion on the stiffening wire 15 between the lowermost horizontal wire 10 and the lateral guard wire 28. It extends forwardly beyond the front corner wire 11 and is then bent upwardly to form a handle 31 the upper end portion of which is bent rearwardly to adjoin one of the horizontal wall wires 10.

The horizontal wall wire 32 located above the upper end portion of the handle 31 extends forwardly and rearwardly beyond the front and rear corner wires 11 and 12 respectively and the front end portion of the wire 32 is bent into an open hook 33 and the rear end portion is formed into an open hook 34 which is disposed coaxially with the hook 29.

A back wall 35 comprises a vertical end wire 36 and another vertical end wire 37 which are connected with each other by means of horizontal back wires 38. An upper back wire 39 is secured to the end wire 36 and extends toward the end wire 37 about two thirds across the entire width of the back wall 35 and is then bent toward the adjacent back wire 38, as at 40. Preferably it crosses this back wire and its end portion is secured to the next back wire 38 so that water opening is provided between the end wire 37 and the bent portion 40 of the upper back wire 39. An intermediate wire 41 is secured to the back wires 39 and 38 approximately one third of the width of the back wall 35 from the end wire 36 and it runs substantially parallel to said end wire.

The back wall 35 is secured in place by inserting the end wire 36 thereof into the open back hooks 34 and 29 on the wires 32 and 28 respectively of the side wall P hanging on the left when facing the rear of the cage and closing said hooks by means of a pair of pliers or the like. The end wire 37 of the back wall is inserted into the hooks 34 and 29 of the next partition P to the right. When other cages are to be built onto this partition the hooks 34 and 29 thereon are left open until the back wall 35 of the next cage is placed in position, otherwise these hooks are also closed.

A front F comprises two front end wires 42, a top cross wire 43 secured to the end wires 42 adjacent to their upper ends and a lower cross wire 44 secured to said end wires 42 adjacent to their lower ends. An intermediate cross wire 45 is mounted on the end wires 42 slightly below the upper cross wire 43 and on the side of said cross wires opposite to the top cross wire 43.

A horizontal side wall wire 46 is located intermediate the top wire 10 and the wire 32 extends forwardly beyond the front corner wire 11 and the front end portion of the wire 46 is formed into an open hook 47 which is coaxial with the hook 33 on the side wall wire 32.

The front F is mounted on the panels P by inserting the front end wires 42 into the hooks 47 and 33 and closing the hooks starting at the right when facing the front of the cage. The hooks on the left partition are left open if another cage is to be added.

Care should be taken that the water opening formed on the back wall 35 is located on top and that the front wall F is mounted so that the top cross wire 43 is disposed on the outside of the cage.

A gate G comprises a top cross wire 48, a lower cross wire 49 and a plurality of gate wires 50. The latter are curved and secured to the top and lower cross wires so that they extend at right angles to said wires and are all curved in the same direction. The end portions of the lower cross wire 49 extend beyond the outer gate wires 50 and are formed into hooks 51 adapted to engage the front wires 42 slidably when the gate G is mounted on the front F. The upper end portion of the gate extends slidably between the upper and the intermediate cross wires 43 and 45 respectively of the front F.

A feed trough T of suitable construction is mounted and secured to the front F in any suitable manner, but is disposed so that its upper edges are located at the same level as the lower cross wire 44 of the front F and that the trough bottom is disposed above the front portion of the bottom 19 permitting an egg landing on said bottom to roll into the basket formed by the upwardly curved front end portions 23 of the bottom wires 20.

The feed trough T extends above and forwardly over the bottom 19 and protects an egg on said bottom from being soiled by feed and hen slobber.

The egg rolls forwardly on the inclined bottom wires 20 and this gives the egg time to dry before it arrives in the basket formed by the forward end curved portions 23 of the longitudinal bottom wires 20.

The outwardly concaved gate G allows a hen better access to the feed trough without bruising her breast.

Figure 6:
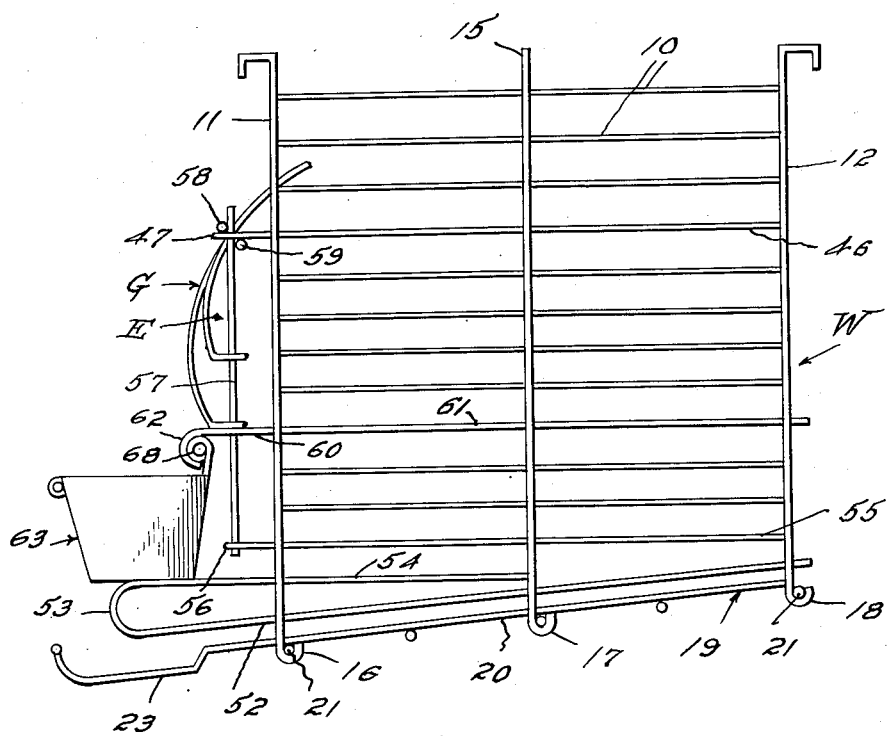
Figure 6 is a side view in elevation of a slightly modified form of a cage.
Figure 7:
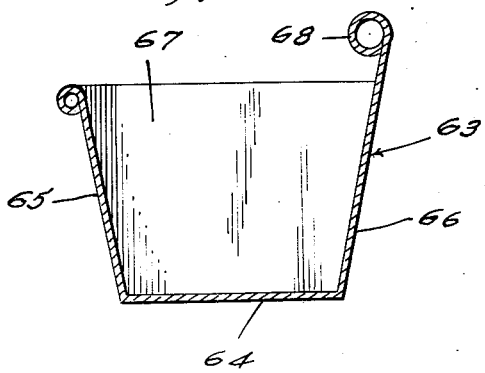
Figure 7 is a view in cross section of a slightly modified form of a feed trough.

In the Figures 6 and 7 a slightly modified form of a cage in accordance with the invention and a feed trough used with this modified cage respectively are embodied. The portions common to the above described cage and the modified cage are designated by the same reference characters.

The side walls or partitions W of the modified cage are constructed similar to the partitions P and comprise a plurality of horizontal wires 10 secured in any preferred suitable manner to a vertical front corner wire 11 and a vertical rear corner wire 12.

Centrally between the front and rear corner wires 11 and 12 a vertical stiffening wire 15 is secured to the horizontal wires, and the wire 15 and the two corner wires 11 and 12 extend downwardly beyond the lowermost horizontal wire 10. The lower end portions of the vertical wires are bent upwardly to form open hooks 16, 17 and 18 as described above. These hooks are disposed in a forwardly inclined plane.

The bottom of the modified cage is constructed similar to the bottom 19 described above and is supported by the hooks 16, 17 and 18 so that it is arranged in a forwardly slanting position.

A transverse wire 52 is secured to the vertical wires 11, 12 and 15 above the bottom 19 and runs parallel to said bottom. It extends forwardly beyond the front corner wire 11, is bent upwardly and rearwardly as at 53 and extends then rearwardly at right angles to the vertical wires 11 and 15, as at 54 to which it is secured in any suitable manner. The horizontal wire 55 of the partition W is located just above the wire portion 54 and extends forwardly beyond the front corner wire 11. The forward end portion of the wire 55 is formed into a horizontal hook 56 which is arranged coaxially with the hook 47 on the horizontal partition wire 46.

A front E comprises a pair of end wires 57 and a horizontal transverse wire 58 is secured on the front of the two end wires adjacent to the upper ends thereof. The end wires 57 are disposed in the hooks 56 and 47 of adjoining panels W and a second transverse wire 59 is secured to the end wires 57 underneath the partition wire 46 and diametrically opposite to the transverse wire 58.

A sliding gate G constructed as described above is slidably mounted on the upper portions of the end wires 57 of the front E and extends slidably between the horizontal wires 58 and 59. When the gate E is in closed position it rests on the front end portions 60 of horizontal wires 61 of two adjacent partitions W. The foremost end portion of each wire 61 is curved downwardly to form a hook 62 which extends farther forwardly than the hooks 56 on the horizontal wires 55 of the partitions W.

A feed trough 63 has a bottom 64, a front wall 65, a rear wall 66 and two end walls 67. It rests on the front end portions of the wire portions 54 of the partitions W and its rear wall 66 extends higher than the end walls 67. The upper marginal portion of the rear wall 66 is rolled forwardly as shown at 68 and the hooks 62 engage this rolled marginal portion to hold the trough 63 securely but removably in working position. The front wall 63 of the trough extends forwardly at an obtuse angle to the bottom 64 so that it protects the basket formed by the front end portions 23 of the bottom wires 20.

From the foregoing description it is thought to be obvious that a chicken coop constructed in accordance with my invention is particularly well adapted for use by reason of the convenience and facility with which it may be assembled and used.

I claim:

1. In an individual coop for chickens, a substantially rectangular body comprising bottom, back and side walls and having its top and front open, means at the lower edges of said side walls for supporting said bottom wall in a forwardly and downwardly sloping position with its front end projecting beyond the front vertical edges of the side walls, other means at the opposite ends of the top edges of said side walls for suspending the coop from a pair of parallel supporting elements, an egg catching trough carried at the front end of said bottom wall, a feed trough, means projecting from the front edges of said side walls for supporting said feed trough crosswise of the lower portion of the open front of the coop, a closure for the open front of the coop above said feed trough, and means projecting from the front edges of said side walls for supporting said closure for vertical sliding opening and closing movements.

2. The invention as defined in claim 1, with the said closure of vertical arcuate form and slidable on said supporting means in an upward direction and inward between said side walls from its normally lowered front closing position to allow access to the interior of the coop without necessitating the removal of said feed trough.

3. The invention as defined in claim 1, with the said walls formed of spaced horizontally disposed wires, other vertical crossing wires connecting the first wires at their ends and intermediate their ends, the first means being constituted in hook elements formed at the lower ends of said vertical wires, said other means being constituted in hook elements formed at the upper ends of the vertical wires at the front and rear ends of said side walls, and other hook elements formed at the rear ends of certain of the horizontally disposed wires of said side walls and engaged with the vertical wires at the opposite ends of said back wall for supporting the latter wall in place.

VICTOR M. IPSEN.

REFERENCES CITED

The following references are of record in the file of this patent:

UNITED STATES PATENTS

| Number | Name | Date |
|---|---|---|
| 1,347,266 | Fink | July 20, 1920 |
| 2,096,356 | Fox | Oct. 19, 1937 |

FOREIGN PATENTS

| Number | Country | Date |
|---|---|---|
| 599,240 | France | Oct. 17, 1925 |
| 478,884 | Great Britain | Jan. 25, 1938 |
| 531,582 | Great Britain | Jan. 7, 1941 |